Oct. 13, 1964 A. B. MOJONNIER ET AL 3,152,944
APPARATUS FOR ASSEMBLING PLASTIC CONTAINERS
Filed Oct. 26, 1961 3 Sheets-Sheet 1
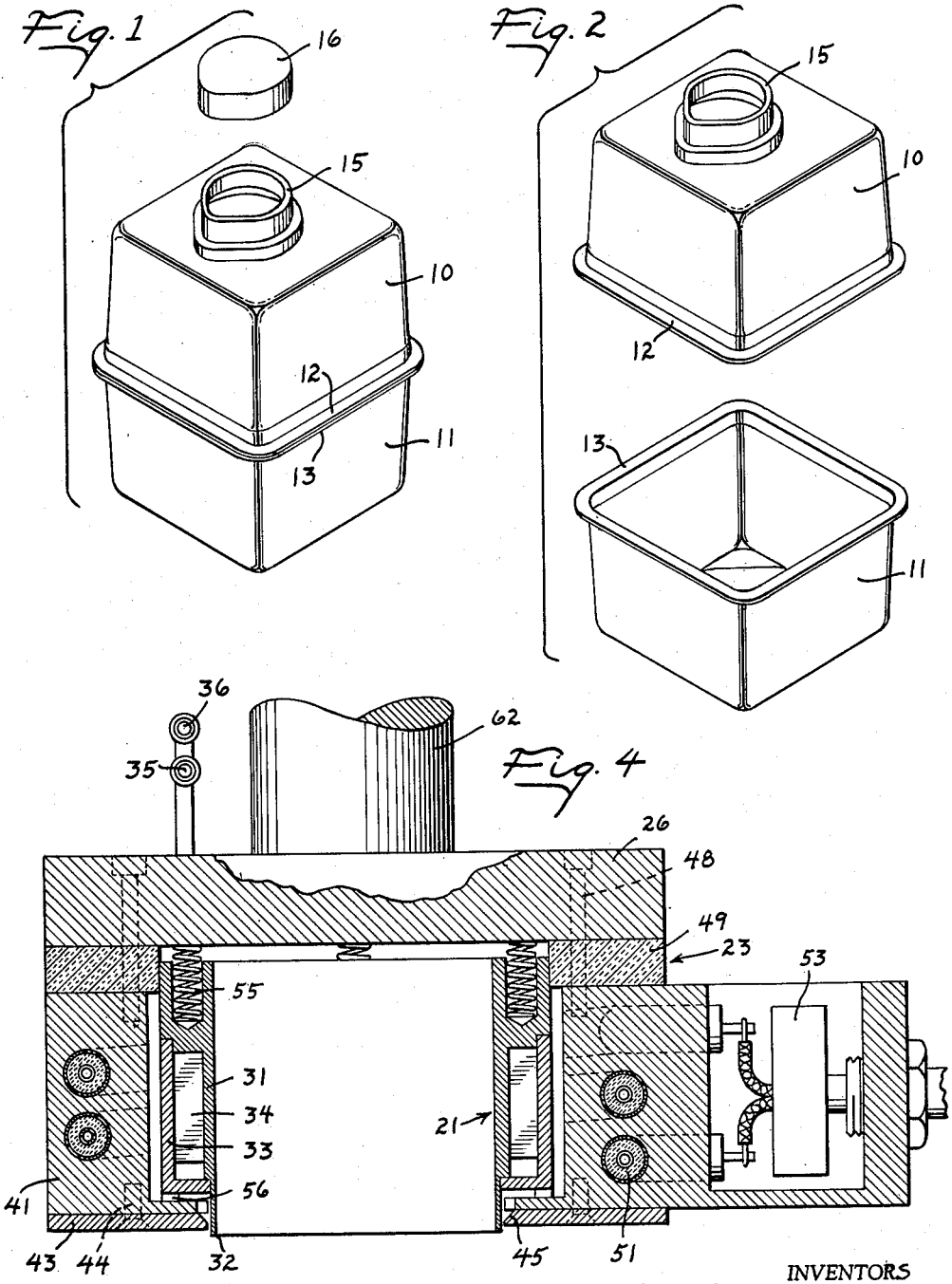
INVENTORS
Albert B. Mojonnier
Fred L. Eastman
BY
McCanna, Morsbach & Pillote

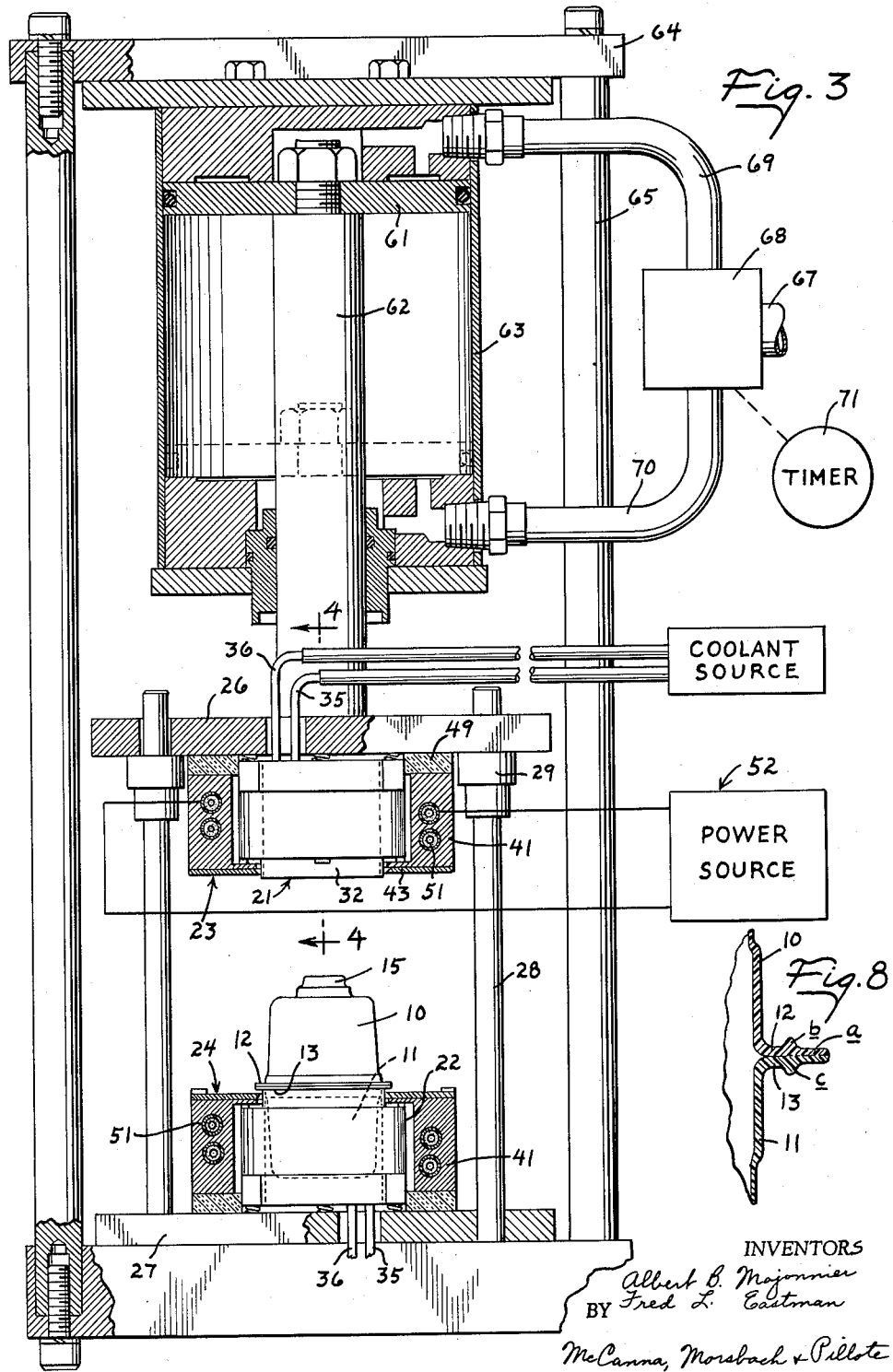

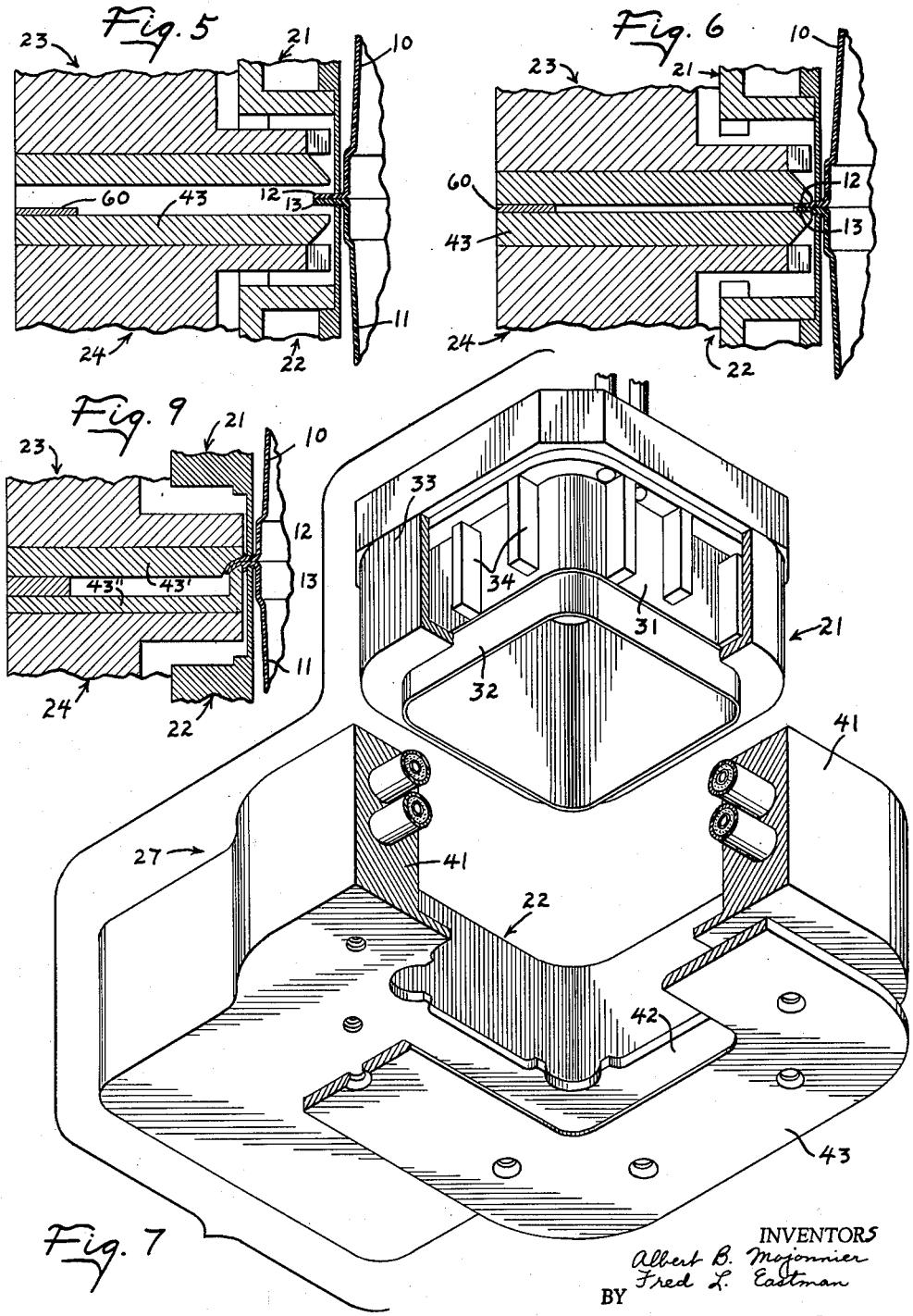

United States Patent Office 3,152,944
Patented Oct. 13, 1964

3,152,944
APPARATUS FOR ASSEMBLING PLASTIC
CONTAINERS
Albert B. Mojonnier and Fred L. Eastman, Chicago, Ill., assignors to Albert Mojonnier, Inc., Chicago, Ill., a corporation of Illinois
Filed Oct. 26, 1961, Ser. No. 147,946
13 Claims. (Cl. 156—498)

The invention relates to an apparatus for heat sealing thermoplastic materials.

The apparatus of the present invention is particularly adapted for joining preformed bodies of the thermoplastic material along mating peripheral flanges to form hollow containers. The joining of the mating flanges on such preformed bodies presents a somewhat different problem than is encountered in joining flat sheets of thermoplastic material. The preformed bodies are generally formed from sheets of thermoplastic material which is shaped, as by drawing between mating dies; by drape forming or by pressure or vacuum forming, and these preformed thermoplastic bodies have an "elastic memory" which tends to cause the bodies to shrink and distort back toward their initial flat form, when the bodies are heated. In the joining of such preformed thermoplastic bodies, difficulties are encountered due to the tendency of the preformed bodies to distort and shrink back to their original shape when subjected to the heat applied during heat sealing of the flanges. In addition, there is frequently a marked variation in the thickness of the flanges on the preformed bodies, which occurs during preforming of the same. In flat sheets, the thickness of the sheets can be accurately maintained so that just the proper amount of heat can be applied to the joint sufficient to effect a heat seal, without producing excessive softening and flow of the material. However, it is not possible to so limit the heat applied, when the thickness of the flanges on the preformed bodies varies with different preformed bodies and also in different portions of the bodies. Since the amount of heat necessary to soften the flanges varies with the thickness of the flanges, the application of heat sufficient to heat seal relatively thin flanges will not properly seal relatively thicker portions of the flanges, and, conversely, heat sufficient to seal relatively thick portions of the flanges tends to cause excessive softening of the thin flange portions, with the consequent tendency of the plastic to flow and shrink in those areas. The problem of joining preformed plastic bodies also varies markedly with different thermoplastic materials. Heretofore, some success has been achieved in sealing preformed bodies formed of thermoplastic materials such as polyethylene, polyvinylchloride etc. However, difficulty has been encountered in joining two cup-shaped preformed bodies of polystyrene, particularly when the bodies are formed with high impact polystyrene which is a copolymer of polystyrene and butadiene rubber. Such materials must be heated to a relatively high temperature of the order of 275 to 310° F. in order to effect a reliable heat seal between the flanges without requiring very high sealing pressures. The heat sealing temperature of high impact polystyrene is substantially above the heat distortion temperature of this material (about 165° F.) and considerable difficulty is encountered with distortion and shrinking of the preformed bodies. While the apparatus of the present invention is particularly adapted for joining preformed cup-shaped bodies of polystyrene, oriented polystyrene and high impact polystyrene, it is also adapted for joining performed bodies formed of other thin thermoplastic material, for example polyethylene, polyvinylchloride etc.

An important object of this invention is to provide an improved apparatus for joining preformed cup-shaped bodies of thin thermoplastic material along mating peripheral flanges and which will effect reliable heat sealing of the flanges without distortion of the bodies.

Another object of this invention is to provide an improved apparatus for joining preformed bodies of thermoplastic material along mating flanges, and which will produce reliable heat seals notwithstanding variations in the thickness of the mating flanges.

Still another object of this invention is to provide an apparatus for heat sealing preformed thermoplastic bodies along mating peripheral flanges, and which provides a strong resilient joint between the flanges without requiring accurate control of the temperatures, pressures, and sealing times used in performing the heat seal.

These, together with various ancillary objects and advantages of this invention will be more readily appreciated as the same becomes better understood by reference to the following detailed description when taken in connection with the accompanying drawings wherein:

FIG. 1 is a perspective view of completed container;

FIG. 2 is an exploded perspective view of the preformed cup-shaped bodies which are to be joined along their mating peripheral flanges;

FIG. 3 is a view shown partially in section and partially diagrammatically, of an apparatus for performing the method of the present invention;

FIG. 4 is a sectional view through one of the jaw assemblies illustrating the parts on a somewhat larger scale than in FIG. 3;

FIGS. 5 and 6 are fragmentary sectional views through the jaw assembly, illustrating the parts in different moved positions during heat sealing of the mating flanges;

FIG. 7 is an exploded perspective view of one of the jaw assemblies;

FIG. 8 is a fragmentary enlarged view illustrating the joint formed between the mating flanges of the preformed bodies; and FIG. 9 is a fragmentary sectional view illustrating a modified jaw arrangement for heat sealing the mating flanges on the bodies and for simultaneously mechanically shaping the sealed flange.

The apparatus of the present invention was specifically designed for the joining of thin bodies formed of high impact polystyrene and is hereinafter specifically described in connection with the heat sealing of such material. It is to be understood, however, that the apparatus of the present invention can be employed to heat other materials, such as plain and linear polyethylene, polyvinylchloride, polypropylene etc., by suitable control of the pressure and temperature ranges at which the method and apparatus is operated. The preformed bodies may be formed from sheet material in any suitable manner, as by die forming between mating dies; drap forming; pressure or vacuum forming, etc. As shown, the bodies have a generally rectangular cross-section and terminate in outwardly extending peripheral flanges designated 12 and 13 on the open end thereof. The bodies are conveniently formed with a taper to facilitate nesting of similar bodies within each other and one of the bodies is preferably formed with a dispensing spout at one end which is closed as by a cap 16.

The side walls of the bodies 10 and 11 are very thin and frequently relatively thinner than the outwardly projecting flanges 12 and 13 thereon. Difficulty has heretofore been encountered in applying sufficient heat to the mating flanges to effect a reliable heat seal without, however, raising the temperature of the remaining portion of the bodies above the temperature at which substantial distortion and deformation can occur. In accordance with the present invention, the cup-shaped bodies 10 and 11 are enclosed in respective cooling jackets 21 and 22 which extend completely around the bodies in the regions adjacent the flanges 12 and 13 thereon. During heat sealing, the inner peripheral portions of the mating flanges are clamped together between the cold jaws on the ends of the cooling jackets 21 and 22 to bring the mating flanges into firm registry and to protect the preformed bodies, and sufficient heat is thereafter applied to the outer peripheral portions of the mating flanges to soften the same and heat seal the outer peripheral portions of the flanges together. In the preferred form, the heat sealing is effected by opposed pairs of heat sealing jaws 23 and 24 and heating means is provided on at least one and advantageously on both of the jaws to heat the outer peripheral portion of the flanges to a temperature above the softening temperature of the plastic material and below the melting temperature at which the material becomes a free-flowing liquid. For high impact polystyrene, the flanges should be heated to a temperature of the order of 275° to 310° F. The heat sealing jaws 23 and 24 thus heat the outer peripheral portion of the flange sufficient to produce softening and plastic flow of the material from between the jaws and provision is made for limiting closing movement of the jaws when the jaws are spaced apart a distance slightly less than the combined thickness of the mating flanges. The flanges formed on the cup shaped bodies 10 and 11 are frequently of non-uniform thickness and further have undulations which inhibit intimate contact between the mating flanges and between the flanges and the heat sealing jaws. Sufficient pressure must be applied to the heat sealing jaws to press out the undulations in the flanges and enable the heat sealing jaws to substantially uniformly contact the flanges for uniform heating of the same. The heat sealing jaws heat the flanges sufficient to produce plastic flow, and, as the jaws are moved to a position in which they are spaced apart a distance less than the normal combined thickness of the flanges, the heat sealing jaws effect a reliable heat seal, notwithstanding variations in thickness of the mating flanges. The cold jaws clamp the inner peripheral portions of the heating flanges together to prevent distortion of the mating flanges upon the application of the heat sealing temperatures thereto and also prevent distortion of the walls of the preformed bodies during the heat sealing operation.

As best shown in FIG. 3, the cooling jacket 21 and heat sealing jaw 23 are conveniently mounted on a common base 26 and the cooling jacket 22 and heat sealing jaw 24 are similarly mounted on a common base 27 to form opposed jaw assemblies which are supported by rods 28 and guides 29 for movement toward and away from each other. In the embodiment illustrated, the cooling jackets 21 and 22 are similarly formed, and the heat sealing jaws 23 and 24 are also similarly formed, and like numerals are utilized to designate corresponding parts. As best shown in FIG. 4, the cooling jackets each include an inner shell designated 31 dimensioned to extend around the respective preformed body 10 or 11, and which shells terminate at one end in a relatively thin axially extending sleeve portion 32. The inner shell 31 and projecting sleeve portion 32 are advantageously formed of a heat conducting material such as metal and provision is made for cooling the shell and sleeve portion sufficient to maintain temperature of the body 10 disposed in the shell below its softening temperature. The shell 31 and sleeve 32 are preferably liquid cooled, it being understood that in some applications wherein the ambient temperature is sufficiently low, the sleeve and shell could be cooled by the use of suitable cooling fins and by passing a stream of cooling air thereover. As best shown in FIG. 4, the outer shell 33 is disposed around the inner shell 31 and defines a flow passage therebetween for cooling liquid and, advantageously, baffles 34 are disposed between the inner and outer shells and extend part way across the flow passage as best shown in FIG. 7 to form a tortuous passage for the cooling liquid. Cooling liquid inlet and return ducts 35 and 36 communicate with the flow passage between the inner and outer shells for passing the cooling liquids therethrough from a coolant source designated generally by the numeral 37 in FIG. 3.

The heat sealing jaws each include a body portion 41 which extends around the cooling jackets in spaced relation thereto, and which body portions have an inwardly extending ledge 42 at one end which overlies the end of the respective cooling jacket. A jaw face plate 43 is attached to the end of the body portions 41 as by fasteners 44 and the jaw face extends inwardly into relatively close radial spaced relation to the sleeve portion 32 of the cooling jacket. The inner edge of the jaw face is spaced from the sleeve portion to prevent direct heat conduction therebetween and is preferably chamferred at its underside, as indicated at 45, to further minimize heat conduction between the jaw face and the sleeve portion 32. The bodies 41 are rigidly mounted on the respective base such as 26 or 27 by fasteners 48 and a block 49 of heat insulating material is preferably interposed between the jaw bodies 41 and the base to minimize heating of the bases. A heating means is mounted on at least one of the jaws and, preferably, both jaws are heated as by a heating element 51 herein shown imbedded in the body 41. The heating elements are connected to a suitable power source designated generally by the numeral 52 and a thermostat 53 is advantageously provided for maintaining the jaw temperature within a preselected range.

The heat sealing jaws 23 and 24 are rigidly supported on their respective bases and the cooling jackets 21 and 22 are mounted for limited axial shifting movement relative to the heat sealing jaws. As best shown in FIG. 4, the cooling jackets are guidably supported in the insulating block 49 for limited axial shifting movement and are yieldably urged by spring 55 in a direction to project the sleeve portion 32 forwardly of the respective jaw face 43. Stops such as 56 are provided for limiting outward movement of the cooling jackets relative to the sealing jaw face.

Any suitable means may be provided for moving the jaw assemblies toward and away from each other and, as shown, the jaw assemblies are fluid operated. A piston 61 is connected through a rod 62 to the base such as 26 on one of the jaw assemblies and the piston is supported in a cylinder 63. The cylinder 63 is mounted on a frame 64 which is connected as by posts 65 to the other jaw assembly. Fluid under pressure is reversibly supplied to opposite ends of the cylinder from a source 67 under the control of a valve 68. The valve is connected through conduits 69 and 70 to opposite ends of the cylinder and is operative in one position thereof to supply fluid pressure to conduit 70 while exhausting fluid pressure from conduit 69 to thereby raise the piston, and is operative in the other position thereof to supply fluid pressure to conduit 69 and exhaust fluid pressure from conduit 70 to thereby lower the piston. While the valve can be manually operated, it is preferable to employ a timer controlled apparatus 71 for operating the valve to control the duration of the heat sealing cycle.

In use of the aforedescribed apparatus, the preformed thermoplastic bodies 10 and 11 are assembled with their flanges 12 and 13 in abutting engagement, which assembly can be preformed either manually or by suitable apparatus (not shown). The assembled bodies are then positioned as shown in FIG. 3 with one body 11 extending into the cooling jacket 22 and the other cooling jacket 21 then brought downwardly around the upper body 10 so that the cooling jackets 21 and 22 protectively enclose the bodies. The ends of the projecting sleeve portions 32 on the cooling jackets form cold jaw faces which, as previously described normally project a short distance above the jaw faces 43 of the heat sealing jaws 23 and 24 so that the inner peripheral portions of the mating flanges 12 and 13 are initially clamped between the cold jaws as shown in FIG. 5, when the jaw assemblies are moved toward each other. The cold jaws firmly press the mating flanges into abutting engagement and, during continued relative movement of the jaw assemblies toward each other, the springs 55 yield and permit the heat sealing jaw faces 43 to move relative to the respective cooling jacket until the heat sealing jaws engage the outer peripheral portions of the flanges, as shown in FIG. 6. In order to effect reliable heat sealing of the flanges, the thermostat 53 is adjusted to maintain the jaw temperature substantially above the softening temperature of the plastic but preferably below the melting temperature thereof to thereby cause the outer peripheral portions of the flanges to fuse and flow together to form an integral joint. For high impact polystyrene, the jaw temperature should be maintained in the range of 275° to 310° F. and preferably about 300° F., and the cooling jacket 31 and sleeve 32 are maintained at a temperature substantially below the heat distortion temperature of the plastic. High impact polystyrene begins to distort at about 150–195° F. and the cooling jacket temperature is maintained well below this heat distortion temperature. The timer is arranged to maintain the jaw assemblies are retracted after the heat sealing optime interval to soften and effect fusion of even relatively thick flanges on the preformed bodies.

In practice it has been found that heating of the flanges for periods somewhat longer than the minimum time required to soften and seal the same, does not result in unsatisfactory seals, and that the time interval during which the jaw assemblies are closed can be varied over a relatively wide range. Thus, for high impact polystyrene, sealing times as short as about 1½ to 2 seconds and as long as a minute or more have produced satisfactory seals. This capability of sealing over a wide range of temperatures and times is of particular value in commercial heat sealing since it enables reliable sealing without requiring expensive equipment and experienced operators. When the jaw assemblies are retracted after the heat sealing operation, the springs 55 maintain the cooling sleeves 32 in yieldable engagement with the inner peripheral portion of the flanges, during the initial retraction of the jaw assemblies. Thus, the cooling jaws operate to strip the flanges from the sealing jaws and, further, rapidly cool the heat seal to prevent damage to the same in subsequent handling operations.

The heat sealed joint produced by the aforedescribed method and apparatus is best shown in FIG. 8. The joint is characterized by the flanges 12 and 13 being integrally fused in the outer peripheral portion designated *a* engaged by the heat sealing jaws 23 and 24, while the inner peripheral portion of the flanges, in the region engaged by the cold jaws 21 and 22, remain separate. The fused outer peripheral portion *a* is thinner than the normal combined thickness of the flanges 12 and 13, and the excess material in the outer fused portion of the flanges is pressed inwardly to form thickened reinforcing ribs *b* on the portion intermediate the outer fused portion *a* and the unsealed inner portion of the flanges. These thickened ribs aid in reinforcing the joint along the line of fusion designated *c* between the flanges. Since the cooling jacket and sleeve portions maintain the temperature of the inner peripheral portions of the flanges below the softening temperature of the plastic, the joint retains the resilient character of the plastic material and, in practice, it has been found that the joints formed in this manner can withstand pressures of substantially the same magnitude as the rest of the container.

A modified form of heat sealing apparatus is illustrated in FIG. 9. In this embodiment, the cooling jackets 21 and 22 and the heat sealing jaws 23 and 24 are the same, and like numerals are used to designate corresponding parts. The heat sealing jaws are provided with modified jaw faces designated 43' and 43" having complementary arcuate flange engaging faces. The heat sealing jaws seal the flanges in generally the same manner as previously described, except that the sealing jaws simultaneously mechanically shape or form the flanges.

We claim:
1. An apparatus for joining carton shells of thin thermoplastic material having mating out-turned flanges which abut each other comprising, a pair of cooling jackets each dimensioned to extend around a respective one of the carton shells and each having a cold jaw on the end thereof engageable with the inner peripheral portion of the flange on a respective carton shell, a pair of heat sealing jaws extending around said cold jaws and engageable with the out-turned flange on a respective carton shell along a line disposed outwardly of said cold jaws, means for moving said pair of cooling jackets and said pair of heat sealing jaws toward each other to clamp the inner peripheral portions of the mating flanges between the cold jaws on the cooling jackets and to bring the heat sealing jaws into heat sealing engagement with the outer peripheral portions of the mating flanges, means on at least one of said heat sealing jaws for heating the mating flanges sufficient to heat seal the outer peripheral portions of the flanges, and means for cooling said cooling jackets sufficient to maintain the temperature of the body of the carton shells below the distortion temperature thereof.

2. An apparatus for joining preformed carton shells of thin thermoplastic material having mating out-turned flanges which abut each other comprising, a pair of cooling jackets each dimensioned to extend around a respective one of the carton shells and each having a cold jaw on the end thereof engageable with the inner peripheral portion of the flange on the respective carton shell, a pair of heat sealing jaws extending around said cold jaws and engageable with the out-turned flange on the respective carton shell along a line disposed outwardly of the cold jaws, means for moving said pair of cooling jackets and said pair of heat sealing jaws toward and away from each other, said moving means being operative to sequentially clamp the inner peripheral portions of said flanges between said cold jaws and to thereafter move said heat sealing jaws into engagement with the outer peripheral portions of the flanges, means on at least one heat sealing jaw for heating the mating flanges sufficient to heat seal the outer peripheral portions of the flanges, and means for cooling the said cooling jackets sufficient to maintain the temperature of the body of said carton shells below the distortion temperature thereof.

3. An apparatus for joining preformed carton shells of thin thermoplastic material having mating out-turned flanges which abut each other comprising, a pair of cooling jackets each dimensioned to extend around a respective one of the carton shells and each having a cold jaw on the end thereof engageable with the inner peripheral portion of the flange on the respective carton shell, a pair of heat sealing jaws extending around said cold jaws and engageable with the out-turned flange on the respective carton shell along a line disposed outwardly of the cold jaws, means for moving said pair of cooling jackets and said pair of heat sealing jaws toward and away from each other, said moving means being operative to sequentially clamp the inner peripheral portions of said flanges between said cold jaws and to thereafter move said heat sealing jaws into engagement with the outer peripheral portions of the flanges, means on at least one heat sealing jaw for heating the mating flanges sufficient to heat seal the outer peripheral portions of the flanges, and means for cooling the said cooling jackets sufficient to maintain the temperature of the body of said carton shells below the distortion temperature thereof, said moving means being operative to thereafter move the heat sealing jaws out of engagement with the flanges before said cold jaws are moved out of engagement with the flanges whereby the cold jaws aid in stripping the heat sealed flanges from the sealing jaws and also to rapidly cool the heat sealed portion of the flanges.

4. An apparatus for joining carton shells of thin thermoplastic material having mating out-turned flanges which abut each other comprising, first and second jaw assemblies mounted for movement toward and away from each other, each jaw assembly including an inner cooling jacket dimensioned to extend around a respective one of the carton shells and having a cold jaw on the end thereof engageable with the inner peripheral portion of the flange on the carton shell, each jaw assembly also including a heat sealing jaw extending around the respective cold jaw and engageable with the outer peripheral portion of the carton flange, means supporting each cold jaw for limited axial shifting movement relative to the respective heat sealing jaw and for yieldably urging the cold jaw in a direction to project the same forwardly of the respective heat sealing jaw, means for moving the first and second jaw assemblies toward each other whereby to sequentially clamp the flanges on the cartons between the cold jaws and to thereafter move the heat sealing jaws into engagement with the portion of the flanges outwardly of the cold jaws, means on at least one heat sealing jaw for heating the flanges sufficient to effect a heat seal therebetween, and means for cooling the cooling jacket sufficient to prevent heating of the bodies of the cartons above the distortion temperature thereof, said cold jaws being operative upon separation of said first and second jaw assemblies to strip the flanges from said heat sealing jaws.

5. The combination of claim 4 including stop means for limiting closing movement of said heat sealing jaws when the jaws are spaced apart a distance slightly less than the combined thickness of said mating flanges.

6. In an apparatus for joining two preformed bodies of thin thermoplastic materials, at least one of which bodies is in the form of cup-shaped shell having an out-turned peripheral flange; a jaw assembly comprising, a cooling jacket dimensioned to receive the body of the shell and having a thin sleeve portion in heat conducting relation with said cooling jacket and extending from one end of the jacket to define a cold jaw at the remote end of the sleeve portion, a heat sealing body having a ledge portion overlying said one end of said cooling jacket and terminating in closely spaced relation to said sleeve portion to define a heat sealing jaw extending around said cold jaw, means supporting said heat sealing body and said cooling jacket for limited relative axial movement, means yieldably urging said cooling jacket relative to said heat sealing body in a direction to extend said cold jaw forwardly of said heat sealing jaw, means for heating said heat sealing jaw sufficient to soften the flange on the shell, and means for cooling said jacket and the sleeve portion thereon sufficient to prevent heating of the body of the shell above the heat distortion temperature thereof.

7. An apparatus for joining carton shells of thin thermoplastic material having mating out-turned flanges which abut each other comprising, first and second jaw assemblies each including a cooling jacket dimensioned to receive the body of the shell and having a thin sleeve portion in heat conducting relation to the respective cooling jacket extending from one end of the cooling jacket to define a cold jaw at the remote end of the sleeve portion, said jaw assemblies each including a heat sealing body having a ledge portion overlying one end of the respective cooling jacket and terminating in closely spaced relation to said sleeve portion to define a heat sealing jaw extending around each cold jaw, means supporting the heat sealing jaw and cooling jacket of each jaw assembly for limited relative axial movement, means yieldably urging the cooling jackets relative to the respective heat sealing body in a direction to project the cold jaw forwardly of the heat sealing jaw, means for heating at least one of the heat sealing jaws sufficient to soften the flanges on the shells, and means for cooling said jackets and the sleeve portions thereon sufficient to prevent heating of the sides of the shells above the heat distortion temperature thereof.

8. An apparatus for joining carton shells of thin thermoplastic material having mating out-turned flanges which abut each other comprising, first and second jaw assemblies each including a cooling jacket dimensioned to receive the body of the shell and having a thin sleeve portion in heat conducting relation to the respective cooling jacket extending from one end of the cooling jacket to define a cold jaw at the remote end of the sleeve portion, said jaw assemblies each including a heat sealing body having a ledge portion overlying one end of the respective cooling jacket and terminating in closely spaced relation to said sleeve portion to define a heat sealing jaw extending around each cold jaw, means supporting the heat sealing jaw and cooling jacket of each jaw assembly for limited relative axial movement, means yieldably urging the cooling jackets relative to the respective heat sealing body in a direction to project the cold jaw forwardly of the heat sealing jaw, means for heating at least one of the heat sealing jaws, heaters on each heat sealing body for heating the sealing jaws sufficient to soften the flanges on the shells, and means for cooling said jackets and the sleeve portions thereon sufficient to prevent heating of the sides of the shells above the heat distortion temperature thereof.

9. In an apparatus for joining two preformed bodies of thin thermoplastic material, at least one of which bodies is in the form of a cup shaped shell having a peripheral side wall and an out-turned flange on the end of the side wall; a jaw assembly comprising a cooling jacket dimensioned to extend around the side wall of the shell, said cooling jacket including a body portion of heat conductive material having an internal opening for receiving the cup-shaped shell, said body portion having a reduced lip portion of heat conductive material disposed in heat conducting relation to said body portion to be cooled thereby and projecting generally axially from the body portion around said internal opening therein to surround and cool the side walls of the shell in the region adjacent the flanges on the shell, said jaw assembly including a heat sealing jaw extending around said lip portion on said cooling jacket and engageable with the out-turned flange on the carton shell for heating the same, means for heating the heat sealing jaw sufficient to soften the flange of the shell, and means for cooling said body portion sufficient to maintain the temperature of the side walls of the shell below the heat distortion temperature thereof.

10. In an apparatus for joining two preformed bodies of thin thermoplastic materials, at least one of which bodies is in the form of a cup shaped shell having a peripheral side wall and an out-turned flange on the end of the side wall; a jaw assembly comprising a cooling jacket dimensioned to extend around the side wall of the shell, said cooling jacket including a body portion of heat conductive material having an internal opening for receiving the cup shaped shell and means defining a fluid flow passage in heat conducting relation with the body portion for passing cooling fluid, said body portion having a reduced lip portion of heat conductive material disposed in heat conducting relation to said body portion to be cooled thereby and projecting generally axially from the body portion around said internal opening therein to surround and cool the side walls of the shell in the region adjacent the flanges on the shell, said jaw assembly including a heat sealing jaw extending around said lip portion on said cooling jacket and engageable with the out-turned flange on the carton shell for heating the same, means for heating the heat sealing jaw sufficient to soften the flange on the shell, and means for passing cooling fluid through said fluid flow passage in said body portion of the cooling jacket to cool the body portion and lip portion of the cooling jacket sufficient to prevent heating of the side walls of the shell about the heat distortion temperature thereof.

11. In an apparatus for joining carton shells of thin thermoplastic material each having a peripheral side wall and an out-turned flange on the end of the side wall, a pair of jaw assemblies each comprising, a cooling jacket dimensioned to extend around the sides of a respective one of the shells, said cooling jackets each including a body portion of heat conductive material having an internal opening for receiving a cup shaped shell and means defining fluid flow passage in heat conducting relation to the body portion for passing cooling fluid, said body portions each having a reduced lip portion of heat conductive material disposed in heat conducting relation to said body portions to be cooled thereby and projecting axially of the respective body portion around the internal opening therein toward the other body portion to surround and cool the side walls of the shells in the region adjacent the flanges on the shells, said jaw assemblies each including a heat sealing jaw extending around said lip portion on the respective cooling jacket and engageable with the out-turned flange on the respective carton shell, means for moving said jaw assemblies toward and away from each other to bring the heat sealing jaws into heat sealing engagement with the mating flanges on the shells, means for heating the heat sealing jaws sufficient to soften the flanges on the shell, means for passing cooling fluid flow passages in said body portions of the cooling jackets to cool the body portions and the lip portions of the cooling jackets sufficient to prevent heating of the side walls of the shells above the heat distortion temperature thereof.

12. In an apparatus for joining carton shells of thin thermoplastic material each having a peripheral side wall and an out-turned flange on the end of the side wall, a pair of jaw assemblies each comprising, a cooling jacket dimensioned to extend around the sides of a respective one of the shells, said cooling jackets each including a body portion of heat conductive material having an internal opening for receiving a cup shaped shell and means defining fluid flow passage in heat conducting relation to the body portion for passing cooling fluid, said body portions each having a reduced lip portion of heat conductive material disposed in heat conducting relation to said body portions to be cooled thereby and projecting axially of the respective body portion around the internal opening therein toward the other body portion to surround and cool the side walls of the shells in the region adjacent the flanges on the shells, said jaw assemblies each including a heat sealing jaw extending around said lip portion on the respective cooling jacket and engageable with the out-turned flange on the respective carton shell, means for moving said jaw assemblies toward and away from each other to bring the heat sealing jaws into heat sealing engagement with the mating flanges on the shells, means for heating the heat sealing jaws sufficient to soften the flanges on the shell, means for passing cooling fluid through said fluid flow passages in said body portions of the cooling jackets to cool the body portions and the lip portions of the cooling jackets sufficient to prevent heating of the side walls of the shells above the heat distortion temperature thereof, and means for limiting closing movement of said heat sealing jaws when the jaws are spaced apart a distance slightly less than the combined thickness of said mating flanges.

13. In an apparatus for joining carton shells of thin thermoplastic material each having a peripheral side wall and an out-turned flange on the end of the side wall, a pair of jaw assemblies each comprising, a cooling jacket dimensioned to extend around the sides of a respective one of the shells, said cooling jackets each including a body portion of heat conductive material having an internal opening for receiving a cup shaped shell and means defining fluid flow passage in heat conducting relation to the body portion for passing cooling fluid, said body portions each having a reduced lip portion of heat conductive material disposed in heat conducting relation to said body portions to be cooled thereby and projecting axially of the respective body portion around the internal opening therein toward the other body portion to surround and cool the side walls of the shells in the region adjacent the flanges on the shells, said jaw assemblies each including a heat sealing jaw extending around said lip portion on the respective cooling jacket and engageable with the out-turned flange on the respective carton shell, means for moving said jaw assemblies toward and away from each other to bring the heat sealing jaws into heat sealing engagement with the mating flanges on the shells, means for heating the heat sealing jaws sufficient to soften the flanges on the shell, and means for passing cooling fluid through said fluid flow passages in said body portions of the cooling jackets to cool the body portions and the lip portions of the cooling jackets sufficient to prevent heating of the side walls of the shells above the heat distortion temperature thereof, said heat sealing jaws having complementary non-planar faces to reshape the mating flanges of the shells therebetween.

References Cited in the file of this patent
UNITED STATES PATENTS

| | | |
|---|---|---|
| 2,488,212 | Lloyd | Nov. 15, 1949 |
| 2,762,420 | Stanton | Sept. 11, 1956 |
| 3,053,726 | Larson | Sept. 11, 1962 |

UNITED STATES PATENT OFFICE
CERTIFICATE OF CORRECTION

Patent No. 3,152,944　　　　　　　　　　　　October 13, 1964

Albert B. Mojonnier et al.

It is hereby certified that error appears in the above numbered patent requiring correction and that the said Letters Patent should read as corrected below.

Column 9, line 24, before "flow" insert -- through said fluid --.

Signed and sealed this 26th day of January 1965.

(SEAL)
Attest:

ERNEST W. SWIDER　　　　　　　　　　　　EDWARD J. BRENNER
Attesting Officer　　　　　　　　　　　　Commissioner of Patents